US010065379B2

United States Patent
Fretz (10) Patent No.: US 10,065,379 B2
(45) Date of Patent: Sep. 4, 2018

(54) DISPERSIBLE NON-WOVEN ARTICLE AND METHODS OF MAKING THE SAME

(71) Applicant: HANGSTERFER'S LABORATORIES, INC., Mantua, NJ (US)

(72) Inventor: Mark Fretz, Mantua, NJ (US)

(73) Assignee: HANGSTERFER'S LABORATORIES, INC., Mantua, NJ (US)

(*) Notice: Subject to any disclaimer, the term of this patent is extended or adjusted under 35 U.S.C. 154(b) by 458 days.

(21) Appl. No.: 14/738,192

(22) Filed: Jun. 12, 2015

(65) Prior Publication Data

US 2016/0362841 A1    Dec. 15, 2016

(51) Int. Cl.
| | |
|---|---|
| B32B 37/00 | (2006.01) |
| B29C 70/54 | (2006.01) |
| D21H 25/06 | (2006.01) |
| D21H 27/00 | (2006.01) |
| D21H 17/24 | (2006.01) |
| D21H 17/34 | (2006.01) |
| D21H 17/36 | (2006.01) |
| D21H 17/37 | (2006.01) |

(Continued)

(52) U.S. Cl.
CPC ............ *B29C 70/54* (2013.01); *D21H 17/24* (2013.01); *D21H 17/34* (2013.01); *D21H 17/36* (2013.01); *D21H 17/37* (2013.01); *D21H 25/06* (2013.01); *D21H 27/002* (2013.01); *B29K 2029/04* (2013.01); *B29K 2105/16* (2013.01); *B29K 2511/12* (2013.01); *B29K 2995/0059* (2013.01); *B29K 2995/0077* (2013.01); *B29L 2007/008* (2013.01); *B29L 2031/769* (2013.01)

(58) Field of Classification Search
CPC ........ B29C 70/54; B29C 65/08; D21H 17/24; D21H 17/34; D21H 17/36; D21H 17/37; D21H 25/06; D21H 27/002
USPC ................................................ 156/73.1, 73.2
See application file for complete search history.

(56) References Cited

U.S. PATENT DOCUMENTS

| | | |
|---|---|---|
| 3,879,257 A | 4/1975 | Gentile et al. |
| 4,605,454 A | 8/1986 | Sayovitz et al. |

(Continued)

FOREIGN PATENT DOCUMENTS

WO    2013/163201 A1    10/2013

OTHER PUBLICATIONS

"Baby Wipes", How Products are Made, pp. 1-3, vol. 6, Mar. 26, 2006 <http://www.madehow.com/Volume-6/Baby-Wipes.html>.

(Continued)

*Primary Examiner* — James Sells
(74) *Attorney, Agent, or Firm* — Westerman, Hattori, Daniels & Adrian, LLP (57) ABSTRACT

A dispersible non-woven article, and methods of making the same. The dispersible non-woven article includes a web of fibers and a dried binder having a plurality of ultrasonic energy treated portions and a plurality of non-ultrasonic energy treated portions. The web of fibers has a basis weight of from about 10 gsm to about 150 gsm. The dried binder comprising a polymer having at least one functional group that is reactive with the fibers. The fibers have at least one functional group that is reactive with the polymer. The article has a cross direction wet tensile strength that is developed by the ultrasonic welding. The article is flushable.

10 Claims, 2 Drawing Sheets

(51) Int. Cl.
  *B29K 105/16* (2006.01)
  *B29K 29/00* (2006.01)
  *B29K 511/12* (2006.01)
  *B29L 7/00* (2006.01)
  *B29L 31/00* (2006.01)

(56) References Cited

U.S. PATENT DOCUMENTS

| | | |
|---|---|---|
| 5,952,251 A | 9/1999 | Jackson et al. |
| 6,514,602 B1 | 2/2003 | Zhao et al. |
| 6,552,162 B1 | 4/2003 | Wang et al. |
| 7,189,307 B2 | 3/2007 | Goulet et al. |
| 7,838,725 B2 | 11/2010 | Noda et al. |
| 8,282,777 B2 | 10/2012 | Bouplon et al. |
| 8,475,689 B2 | 7/2013 | Sun et al. |
| 2004/0221367 A1 | 11/2004 | Darrow |
| 2005/0148261 A1 | 7/2005 | Close et al. |
| 2007/0044891 A1 | 3/2007 | Sellars |
| 2007/0232179 A1* | 10/2007 | Polat .................... D06M 15/507 442/414 |
| 2008/0319407 A1* | 12/2008 | Erdem ...................... D04H 1/42 604/367 |
| 2014/0311696 A1 | 10/2014 | Viazmensky et al. |
| 2015/0011956 A1 | 1/2015 | Roe et al. |
| 2015/0118403 A1 | 4/2015 | Zwick et al. |

OTHER PUBLICATIONS

Flegenheimer, "Wet Wipes Box Says Flush. New York's Sewer System Says Don't.", The New York Times, Mar. 15, 2015, pp. 1-4, <http://nyti.ms/1DdZxjC>, cited in the Specification.

Neff, "Could FTC and Supreme Court Send Flushable Wipes Down the Toilet?" CMO Strategy—Advertising Age, May 28, 2015, pp. 1-2, <http://adage.com/article/cmo-strategy/ftc-supreme-court-put-flushable-wipes-toilet/298788/>.

\* cited by examiner

Figure 1

Cross direction

DISPERSIBLE NON-WOVEN ARTICLE AND METHODS OF MAKING THE SAME

FIELD OF THE INVENTION

The present invention relates to a dispersible non-woven article comprising a web of fibers and a dried binder, wherein a portion of the non-woven article is treated with ultrasonic energy, and methods of making the same.

BACKGROUND

In recent years, evolving hygienic sensibilities coupled with a desire for convenience has fueled a rise in wet wipe popularity. However, much controversy is associated with the disposal of current wipes. In light of waste treatment facility requirements, there is a need for a wipe that is water dispersible.

The ability to easily dispose of single use paper or nonwoven articles has been the objective of numerous studies. Such products not only call for good wet and dry strength of the product during use, but for the product to disperse in aqueous environments without clogging waste disposal or septic systems. Products that would benefit from such properties include, for example, wipes, toweling used for wet or dry cleanup, napery, diaper, sanitary products, toilet papers toilet seat covers, and etc.

Different technologies have provided dispersible paper and non-woven products.

U.S. Pat. No. 7,838,725 describes a mechanically weakened paper. The web contains two "mechanically weakened" layers that are joined by a water sensitive binder such as polyvinyl alcohol or starch. Salt sensitive polymeric ("ion trigger") binders are insoluble in aqueous salt solutions but soluble when the salt solution is diluted, allowing the production of dispersible paper and non-woven products. An issue is that salt solutions can be irritating to sensitive skin.

U.S. Pat. No. 7,189,307 teaches a fibrous sheet comprising a topically-applied network of a cured binder composition resulting essentially from the cross-linking reaction of a carboxylated vinyl acetate-ethylene terpolymer emulsion and an epoxy-functional polymer. Example 11 in this patent discloses a binder which also incorporated glyoxal as a crosslinking agent in the latex formulation, using Kymene® 2064 (an epoxy-functional polymer), and AIRFLEX 426 (a carboxylated vinyl acetate-ethylene terpolymer emulsion). The epoxy-functional polymers provide permanent wet strength and do not provide a dispersible non-woven or paper product.

U.S. Pre-grant Patent Application Publication No. 2014/0311696 discloses a dispersible dry-wipe article comprising a dried binder in contact with a web of fibers. The dried binder comprises a polyfunctional aldehyde which imparts the dispersibility characteristic to the dry wipe.

However, wipes currently being sold continue to have problems in use. Such as, the city of New York has spent more than $18 million in the past five years on wipe-related equipment problems, with the volume of materials extracted doubled since 2008. Wet wipes, which do not disintegrate the way traditional toilet paper does, have plagued, for example, Hawaii, Alaska, Wisconsin, California, Portland, Oreg., and Portland, Me. Flegenheimer, M. (2015 Mar. 13). "Wet Wipes Box Says Flush. New York's Sewer System Says Don't." The New York Times. Retrieved from http://www.nytimes.com While flushable non-woven wet wipes are currently available, still there exists a need to have a wipe that can have sufficient loft, texture, patterns and fire retardant to exhibit additional benefits of feel, safety and efficiency. Non-woven wipes containing a dry binder that are currently available, provide wet tensile strength that is either too low initially to function effectively after aqueous saturation or too high to afford flushability. Additionally, the conventional method of hydroentangling affords little ability to introduce patterns and loft to the articles, and makes use of fibers that are both flammable and long resulting in no resistance to flame when dried and potential to tangle in waste treatment. Thus, there exists a need for a flushable wipe having good wet strength and that can have loft, texture, patterns and is fire retardant and dispersible.

In particular, it is desirable to have a dispersible non-woven article that can be used with a cleaning agent or aqueous solution, and wherein the dispersibility of the article is controlled by the patterns introduced to the article. It would be beneficial for the item to have sufficient wet strength and design to be used efficiently while being flushable in a toilet and of degradable material that would be safe for home sanitary and septic systems.

The aforementioned U.S. Patents and U.S. Pre-grant Patent Application Publication are hereby incorporated by reference.

SUMMARY

In one embodiment, the present invention provides a dispersible non-woven article including a web of fibers having a plurality of ultrasonic energy treated portions and a plurality of non-ultrasonic energy treated portions. The treated portions may be sized and arranged in a predetermined manner for providing a desirable balance of properties to the dispersible non-woven article. The ultrasonic energy imparts wet tensile strength to a binder that otherwise would have very little wet tensile strength. What enables the dispersibility of the non-woven article are the portions of the article that is not treated with ultrasonic energy to break up when in a turbulent aqueous environment, such as the waste treatment environment, and particularly when encountering a pump or pump screen.

In one embodiment, the present invention provides a dispersible non-woven article including a web of fibers and a dried binder in contact with the fibers having a plurality of ultrasonic energy treated portions and a plurality of non-ultrasonic energy treated portions. The web of fibers may have a basis weight of from about 10 grams per square meter (gsm) to about 150 gsm. The dried binder includes a polymer. The polymer comprising a polymeric segment. The polymer has at least one functional group that is reactive with the fibers. The fibers have at least one functional group that is reactive with the polymer. The ultrasonic energy imparts more wet tensile strength to the article via interaction with the binder.

In one embodiment, the present invention includes a dispersible non-woven article including a web of fibers and a dried binder in contact with the fibers having a plurality of ultrasonic energy treated portions and a plurality of non-ultrasonic energy treated portions. The treated portions may be sized and arranged in a predetermined manner for providing a desirable balance of properties to the dispersible non-woven article. The web of fibers may have a basis weight of from about 10 gsm to about 150 gsm. The dried binder includes a polymer. The polymer comprising a polymeric segment. The polymer has at least one functional group that is reactive with the fibers. The fibers have at least one functional group that is reactive with the polymer. The ultrasonic energy imparts additional wet tensile strength to the article via interaction with the binder.

The polymer may comprise at least one polymeric segment including vinyl chloride, vinyl acetate, ethylene, vinyl alcohol, and combinations thereof. For example, the polymer may comprise ethylene vinyl chloride or vinyl acetate ethylene. The dispersible non-woven article may comprise a dried binder in an amount from about 1 wt % to about 50 wt % of the total weight of the dispersible non-woven article. The dispersible non-woven article may comprise a dried binder in an amount from about 1 wt % to about 40 wt % of the total weight of the dispersible non-woven article. The dispersible non-woven article may comprise a dried binder in an amount from about 2 wt % to about 40 wt % of the total weight of the dispersible non-woven article. The dispersible non-woven article may comprise a dried binder in an amount from about 5 wt % to about 40 wt % of the total weight of the dispersible non-woven article. The dispersible non-woven article may comprise a dried binder in an amount from about 10 wt % to about 40 wt % of the total weight of the dispersible non-woven article. The dispersible non-woven article may comprise a dried binder in an amount from about 20 wt % to about 40 wt % of the total weight of the dispersible non-woven article. The dispersible non-woven article may comprise a dried binder in an amount from about 30 wt % to about 40 wt % of the total weight of the dispersible non-woven article. The dispersible non-woven article may comprise a dried binder in an amount from about 1 wt % to about 30 wt % of the total weight of the dispersible non-woven article. The dispersible non-woven article may comprise a dried binder in an amount from about 5 wt % to about 30 wt % of the total weight of the dispersible non-woven article. The dispersible non-woven article may comprise a dried binder in an amount from about 10 wt % to about 30 wt % of the total weight of the dispersible non-woven article. The dispersible non-woven article may comprise a dried binder in an amount from about 1 wt % to about 20 wt % of the total weight of the dispersible non-woven article. The dispersible non-woven article may comprise a dried binder in an amount from about 5 wt % to about 20 wt % of the total weight of the dispersible non-woven article. The dispersible non-woven article may comprise a dried binder in an amount from about 10 wt % to about 20 wt % of the total weight of the dispersible non-woven article.

The web of fibers may comprise natural fibers, synthetic fibers, or a combination thereof. The natural fibers may be cellulosic fibers, for example. The natural cellulosic fibers may be pulped cellulosic fibers. The web of fibers may comprise recycled fibers. The dispersible non-woven article may have a pass through percentage value of at least about 25% through a 12.5 mm sieve after 2 hours in a slosh box. The initial cross direction wet tensile strength may be at least about 20% of an initial cross direction dry tensile strength.

The dried binder that may be in contact with the fibers may be formed by contacting the web with a binder composition using a spray process, a saturation process, a printing process, or a combination thereof or wherein the binder composition is applied and dried on the web. For example, the binder composition may be dried on the web with a drying can, via air dryers, heat or other methods used for nonwoven or specialty paper processes. The binder composition may be dried to form a bonded web. The binder composition may be dried on the web in a double recrepe process to form the dried binder.

In another embodiment, the invention provides a method of making a dispersible non-woven article, the method including forming a web of fibers, contacting the web of fibers with a binder composition, drying the binder composition to form a dried binder in contact with the web of fibers, and subjecting a plurality of portions of the dispersible non-woven article to ultrasonic energy. The web of fibers has a basis weight of from about 10 gsm to about 150 gsm. The binder composition includes an aqueous polymer dispersion. The dispersible non-woven article may have a pass through percentage value of at least about 25% through a 12.5 mm sieve after 2 hours in a slosh box.

The aqueous polymer dispersion may comprise a polymer comprising at least one polymeric segment selected from the group consisting of vinyl acetate, ethylene, vinyl chloride, vinyl alcohol, and combinations thereof. For example, the polymer may comprise ethylene vinyl chloride or vinyl acetate ethylene. The polymer may have a glass transition temperature of less than about 60° C. The web of fibers may be formed via wet forming, air laying, dry forming or a combination thereof. The contacting step may be performed using a spray process, a saturation process, a printing process, or a combination thereof. The contacting and drying steps may be performed as part of a double recrepe process.

DETAILED DESCRIPTION

It is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter, as well as additional items.

As used herein, the terms dispersible and dispersable can be used interchangeably, and the terms dispersibility and dispersability can be used interchangeably.

As used herein, "dispersible" and "dispersable" mean that at least some of the components of a material are capable of breaking down into smaller pieces than the original piece when placed in an aqueous environment.

As used herein, "water dispersible" and "water dispersable" mean that at least some of the components of a material are capable of breaking down into smaller pieces than the original piece.

As used herein, the terms "ultrasonic bonding" and "ultrasonic welding" can be used interchangeably.

As used herein, "ultrasonic bonding" and "ultrasonic welding" refers to "the use of high frequency sound to generate localized heating through vibration and cause thermoplastic fibers to bond to one another," (as defined by the Association of the Nonwoven Fabrics Industry 'INDA').

As used herein, "ultrasonic bonding" and "ultrasonic welding" means a process performed, for example, by exposing portions of the dispersible non-woven article to ultrasonic energy.

As used herein, a "wet wipe" refers to a dispersible non-woven article that is to be stored and/or used while in an environment including an aqueous content. While the dispersible non-woven article is not comprised of liquid, it is a carrier of the liquid in its environment.

As used herein, a "dry wipe" refers to a dispersible non-woven article that is to be stored in an environment that has a low proportion of aqueous content in its environment.

As used herein, "polymer" generally includes, but is not limited to, homopolymers, copolymers, such as, for example, block, graft, random and alternating copolymers, terpolymers, etc., and blends and modifications thereof. Unless otherwise stated, the term "polymer" includes all possible geometrical configurations of the materials. These configurations include, but are not limited to, isotactic, syndiotacite and random symmetries.

As used herein, the term "flushable" means that an dispersible non-woven article, when flushed down a commode, will pass through the commode plumbing, the sewer laterals (e.g., the piping between the house or building and the main sewer line) without clogging.

As used herein, "web," "web of fibers," "nonwoven," "nonwoven web" and "nonwoven fibrous web" can be used interchangeably. Webs have been formed from many processes such as, for example, meltblowing processes, spunbonding processed, and boned carded web processes. These are for exemplary purposes only, and are not limiting.

As used herein, "web," "web of fibers," "nonwoven," "nonwoven web" and "nonwoven fibrous web" refers to a fabric made directly from a web of fiber, without the yarn preparation necessary for weaving and knitting (as defined by INDA).

This disclosure provides dispersible non-woven articles and methods of making the same.

Dispersible Articles

The dispersible non-woven articles of the present invention can be in a number of articles, including, but not limited to wet wipes, baby wipes, adult wipes, pet wipes, feminine wipes, cleaning wipes, industrial cleaning wipes, dressings, and the like. The dispersible non-woven article is capable of dispersing in an aqueous solution.

The dispersible non-woven article of the present invention is capable of maintaining sufficient tensile strength due primarily by ultrasonic welding a portion of the dispersible non-woven article. The specific pattern and amount of welding afford the dispersible non-woven article the ability to be removed from the package while maintaining its integrity until it is disposed of in an aqueous environment such as a toilet. What enables the dispersibility of the non-woven article is the portions of the article not treated with ultrasonic energy that breaks up when in a turbulent aqueous environment, such as the waste treatment environment.

Non-Woven Web of Fibers

The web of fibers includes material capable of serving as a base for the dispersible non-woven article having the properties described herein, particularly the strength and flushability properties. In principle, this involves competing forces, as the web of fibers must be bound together strongly enough to provide sufficient wet strength to function as a wipe for some period of time after contacting water, but not bound together too strongly to impede flushability.

Non-woven substrates may be comprised of a variety of natural and/or synthetic materials. By "natural" it is meant those materials which are derived from plants, animals, insects or by-products thereof. By "synthetic" it is meant those materials which are obtained primarily from man-made materials, or natural materials which have been further altered. Non-limiting examples of natural materials useful in the present invention are silk fibers, keratin fibers (such as wool fibers, camel hair fibers) and cellulosic fibers (such as wood pulp fibers, cotton fibers, hemp fibers, jute fibers and flax fibers).

Non-limiting examples of synthetic materials include those selected from the group containing acetate fibers, acrylic fibers, cellulose ester fibers, cotton fibers, modacrylic fibers, polyamide fibers, polyester fibers, polyolefin fibers, polyvinyl alcohol fibers, rayon fibers, polyurethane foam, and mixtures thereof.

The web of fibers include degradable fibers and optionally include nondegradable fibers. Degradable fibers include, but are not limited to, natural degradable fibers, such as scoured cotton and wool; pulped degradable fibers, such as pulped cellulosic fibers, including pulped wood fibers, pulped cotton fibers, pulped abaca fibers, pulped hemp fibers, pulped flax fibers and pulped jute fibers; and synthetic degradable fibers, such as synthetic cellulosic fibers, including rayon and lyocell. Nondegradable fibers include, but are not limited to, polyesters, such as polyethylene terephthalate, polybutylene terephthalate and polylactic acid; polyolefins, such as polypropylenes, polyethylenes and copolymers thereof; and polyamids, such as nylons.

In some embodiments, the web of fibers includes at least about 80% degradable fibers, at least about 85%, at least about 90%, at least about 95%, at least about 96%, at least about 97%, at least about 98%, at least about 99%, at least about 99.5% or at least about 99.9% degradable fibers. In some embodiments, the web of fibers includes at most about 100% degradable fibers, at most about 99.9% degradable fibers, at most about 99.5% degradable fibers, at most about 99% degradable fibers, at most about 98% degradable fibers, at most about 97% degradable fibers, or at most about 95% degradable fibers. This includes embodiments where the web of fibers includes degradable fibers in amounts ranging from about 80% to about 100%, including but not limited to, amounts ranging from about 90% to about 99.9%, and amounts ranging from about 95% to about 99%.

In some embodiments, the web of fibers includes at least about 5% cellulosic fibers, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% cellulosic fibers. In some embodiments, the web of fibers includes at most about 100% cellulosic fibers, at most about 95%, at most about 90%, at most about 85%, at most about 80%, at most about 75%, at most about 70%, at most about 65%, at most about 60%, at most about 55%, at most about 50%, at most about 45%, at most about 40%, at most about 35%, at most about 30%, at most about 25%, at most about 20%, at most about 15%, or at most about 10% cellulosic fibers. This includes embodiments where the web of fibers includes cellulosic fibers in amounts ranging from about 5% to about 100%, including but not limited to, amounts ranging from about 50% to about 99.9%, and amounts ranging from about 90% to about 99%. In certain embodiments, the web of fibers includes about 100% cellulosic fibers. In preferred embodiments, the web of fibers includes at least about 50% cellulosic fibers.

In some embodiments, the web of fibers includes at least about 5% natural fibers, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% natural fibers. In some embodiments, the web of fibers includes at most about 100% natural fibers, at most about 95%, at most about 90%, at most about 85%, at most about 80%, at most about 75%, at most about 70%, at most about 65%, at most about 60%, at most about 55%, at most about 50%, at most about 45%, at most about 40%, at most about 35%, at most about 30%, at most about 25%, at most about 20%, at most about 15%, or at most about 10% natural fibers. This includes embodiments where the web of fibers includes natural fibers in amounts ranging from about 5% to about 100%, including but not limited to, amounts ranging from about 50% to about 99.9%, and amounts ranging from about 90% to about 99%. In certain embodiments, the web of fibers includes about 100% natural fibers.

In some embodiments, the web of fibers includes at most about 20% nondegradable fibers, at most about 15%, at most about 10%, at most about 5%, at most about 4%, at most about 3%, at most about 2%, at most about 1%, at most about 0.5%, or at most about 0.1% nondegradable fibers. In certain embodiments, the web of fibers includes about 0% nondegradable fibers.

In some embodiments, the web of fibers includes recycled fibers. In some embodiments, the web of fibers includes at least about 1% recycled fibers, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% recycled fibers. In some embodiments, the web of fibers includes at most about 100% recycled fibers, at most about 95%, at most about 90%, at most about 85%, at most about 80%, at most about 75%, at most about 70%, at most about 65%, at most about 60%, at most about 55%, at most about 50%, at most about 45%, at most about 40%, at most about 35%, at most about 30%, at most about 25%, at most about 20%, at most about 15%, or at most about 10% recycled fibers. This includes embodiments where the web of fibers includes recycled fibers in amounts ranging from about 1% to about 100%, including but not limited to, amounts ranging from about 10% to about 80%, and amounts ranging from about 30% to about 50%. In some embodiments, the web of fibers includes about 100% recycled fibers.

The web of fibers may be formed by wet or dry techniques. Examples of wet processes include, but are not limited to, traditional or specialty papermaking processes capable of handling pulp or "short cut" synthetic fibers, use of traditional Fourdrinier machines, processes using cylinder or incline wire machines that can handle longer fiber furnishes, and the like. Examples of dry processes include, but are not limited to, forming an air laid web.

Fibers

In some embodiments, the fibers include cellulosic fibers. Suitable cellulosic fibers include, but are not limited to, wood pulp cellulosic fibers, synthetic cellulosic fibers, cotton fibers, linen fibers, jute fibers, hemp fibers, hardwood fiber furnishes, softwood fiber furnishes, and the like.

In some embodiments, the fibers may be pulped by chemical or mechanical means. In some embodiments, the fibers may be bleached or unbleached. In some embodiments, the fibers may be post treated. In some embodiments, the post treatment may include being mercerized, crosslinked or further chemically treated.

In some embodiments, the fibers may have an average length of at most about 40 mm, at most about 35 mm, at most about 30 mm, at most about 25 mm, at most about 20 mm, at most about 15 mm, at most about 10 mm, or at most about 5 mm. In some embodiments, the fibers may have an average length of at least about 0.01 mm, at least about 0.05 mm, at least about 0.1 mm, at least about 0.5 mm, at least about 1 mm, or at least about 5 mm.

Dried Binder

The dried binder includes material capable of serving as a binding agent for the dispersible non-woven article having the properties described herein, particularly the strength and flushability properties. In principle, this involves competing forces, as the binder must bind strongly enough to provide sufficient wet strength to function as a wipe for some period of time after contacting water, but does not bind too strongly to impede flushability.

In order to achieve a dispersible non-woven article, the dried binder may further include permanent wet strength agents. The dried binder may further include permanent wet strength agents that would provide permanent wet strength to a dispersible non-woven article when subjected to ultrasonic welding. The dried binder may include permanent wet strength agents that would provide permanent wet strength to an dispersible non-woven article with the proviso that the dispersible non-woven article has a Cross Directional Wet Tensile (CDWT) value, as measured by the INDA WSP 110.4.R4 Strip Tensile Test, 2012 revision, that is at most about 60% of the initial CDWT after at least 360 minutes of aqueous saturation, at least 240 minutes, at least 120 minutes, at least 60 minutes of aqueous saturation. In some embodiments, the dried binder may include permanent wet strength agents that would provide permanent wet strength to an dispersible non-woven article with the proviso that the dispersible non-woven article has a CDWT, as measured by the INDA WSP 110.4.R4 Strip Tensile Test, 2012 revision, that is at most about 50%, at most about 40%, at most about 30%, at most about 20%, or at most about 10% of the initial CDWT after 120 minutes of aqueous saturation.

Binder Composition

In some embodiments, the dried binder is formed by contacting the web with a binder composition. In some embodiments, the dried binder is formed by drying the binder composition. The binder composition includes all components of the dried binder, as well as any solvents or excipients necessary to accommodate contacting the web with the binder composition and forming the dried binder. A non-limiting example includes polyvinylalcohol. Generally, any component of the binder composition that is not a part of the dried binder may be removable by the contacting and drying process.

The binder composition may have a pH of from 3 to 8. For example, the pH of the binder composition may be from 4 to 7 or from 5 to 6. Without being bound by any particular theory, a lower pH may provide greater wet strength. However, too low of a pH may negatively impact the flushability of the dispersible non-woven article.

Polymer

The polymer includes polymers capable of interacting with the other components of the dispersible non-woven article in order to provide the properties described herein, particularly the strength and flushability properties.

In some embodiments, the polymer includes at least one functional group that is reactive with the fibers. In certain embodiments, the polymer may interact with the fibers via non-covalent interactions such as hydrogen bonds, Van der Waals forces, and the like. The polymer may also interact with itself and the fibers via ultrasonic welding. The ultrasonic energy may result in the polymer crosslinking with itself to impart wet strength to the dispersible non-woven article.

The term polymeric segments, as used herein, refers to some portion of the overall polymer structure. For example, a vinyl acetate homopolymer has at least one polymeric segment that is vinyl acetate. A vinyl acetate ethylene copolymer has at least one polymeric segment that is vinyl acetate and at least one polymeric segment that is ethylene. In principle, a polymeric segment can be of any size smaller than the size of the polymer itself. In some embodiments, the polymer includes hydrophobic polymeric segments, hydrophilic polymeric segments, water-soluble polymeric segments, and combinations thereof. In some embodiments, the polymer includes at least one polymeric segment selected from the group consisting of vinyl chloride, vinyl acetate, ethylene, vinyl alcohol, styrene, butadiene, methyl methacrylate, methyl acrylate, ethyl methacrylate, ethyl acrylate, butyl methacrylate, butyl acrylate, isobutyl methacrylate, isobutyl acrylate, 2-ethylhexyl acrylate, lauryl methacrylate, lauryl acrylate, acrylic acid and its salts, methacrylic acid and its salts, itaconic acid and its salts, acrylamide, hydroxyethyl methacrylate, hydroxyethyl acrylate, partially and fully hydrolyzed polyvinyl alcohol, and polysaccharides (e.g., starch, hydroxyethylcellulose). In certain embodiments, the polymer include at least one polymeric segment selected from the group consisting of vinyl acetate, ethylene, and vinyl alcohol. In certain embodiments, the polymer may comprise ethylene vinyl chloride or vinyl acetate ethylene copolymer.

In certain embodiments, the polymer may be dispersible in water. In some embodiments, the polymer may be formed by emulsion polymerization. In certain embodiments, the polymer is a poly(vinyl alcohol) stabilized vinyl acetate-ethylene copolymer.

The performance of the polymer may be impacted by its glass transition temperature. Without wishing to be bound by any particular theory, it is believed that the glass transition temperature may have an impact on forming a stable binder composition that can be brought into contact with a web of fibers. However, there is no particular limitation with respect to the glass transition temperature and the dried binder in contact with the fibers. Nonetheless, without being bound by any particular theory, use of a polymer having a lower glass transition temperature may yield a softer dispersible non-woven article. In some embodiments, the polymer has a glass transition temperature of at most about 150° C., at most about 140° C., at most about 130° C., at most about 120° C., at most about 110° C., at most about 100° C., at most about 90° C., at most about 80° C., at most about 70° C., at most about 60° C., at most about 50° C., or at most about 40° C. In some embodiments, the polymer has a glass transition temperature of at least about −50° C., at least about −40° C., at least about −30° C., at least about −20° C., at least about −10° C., at least about 0° C., at least about 10° C., at least about 20° C., or at least about 30° C. This includes embodiments having polymers with glass transition temperatures ranging from about −50° C. to about 150° C., such as glass transition temperatures ranging from about −40° C. to about 60° C., and glass transition temperatures ranging from about −20° C. to about 20° C.

In embodiments where the polymer is a vinyl acetate ethylene copolymer, the vinyl acetate content may be at least about 60%, at least about 65%, at least about 70%, at least about 75%, at least about 80%, at least about 85%, or at least about 90% by weight of the polymer. In embodiments where the polymer is a vinyl acetate ethylene copolymer, the vinyl acetate content may be at most about 95%, at most about 90%, at most about 85%, at most about 80%, at most about 75%, at most about 70%, or at most about 65% by weight of the polymer.

In some embodiments, the polymer is stabilized by a suitable stabilizer. In some embodiments, the polymer is stabilized by a surfactant, a stabilizing polymer, or a combination thereof. In certain embodiments, the stabilizing polymer is a polyhydroxyl containing polymer, such as polyvinyl alcohol, a carboxylate containing polymer, or combinations thereof.

In certain embodiments, the polyvinyl alcohol may be at least 50% hydrolyzed, at least 75% hydrolyzed, at least 80% hydrolyzed, at least 85% hydrolyzed, at least 90% hydrolyzed, at least 95% hydrolyzed, or at least 99% hydrolyzed. In certain embodiments, the secondary polymer may have molecular weights ranging from about 10 kDa to about 500 kDa, including but not limited to, molecular weights ranging from about 31 kDa to about 50 kDa, 13 kDa to about 23 kDa, or 10 kDa to about 50 kDa.

Examples of commercially available polymers include, but are not limited to, the VINNAPA™ series (Wacker Chemical Corporation, Allentown, Pa.), VINNOL™ series (Wacker Chemical Corporation, Allentown, Pa.), the ELEVATE™ series (Westlake Chemical, Houston, Tex.), and the ELVAX™ series (DuPont™, Wilmington, Del.).

Ultrasonic Welding

Ultrasonic welding can include exposing portions of the dispersible non-woven article to ultrasonic energy sufficient to soften and bond the exposed portions, without softening and bonding the non-exposed portions. The ultrasonic energy may result in the polymer crosslinking with itself to impart wet strength to the treated portions of the dispersible non-woven article.

Referring to FIGS. 1 to 5, the dispersible non-woven articles include a plurality of ultrasonic energy treated portions 1 and a plurality of non-ultrasonic energy treated portions 2. The treated portions may be sized and arranged in a predetermined manner for providing a desirable balance of properties to the dispersible article. It is believed that the non-ultrasonic energy treated portions retain desirable characteristics such as softness and porosity and allow the article to efficiently disperse, while the ultrasonic energy treated portions provide sufficient wet strength and durability to the article.

The patterns that are introduced to the wipe through ultrasonic welding are designed to increase directional tensile strength in order to increase the ability of the wipe to be removed from the package while not aggravating the ability of it to be dispersible in such a way that the dispersible non-woven article should not be flushed.

Figure 1:
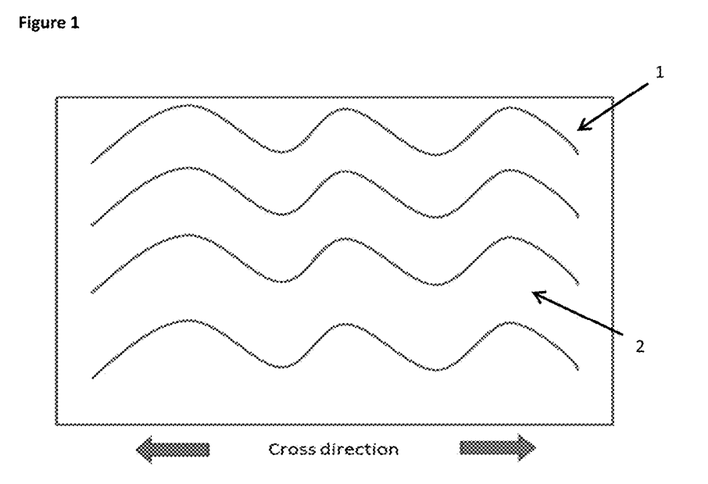
FIG. 1 is a non-woven article according to the present invention comprising a plurality of ultrasonic energy treated portions 1 and a plurality of non-ultrasonic energy treated portions 2.
Figure 2:
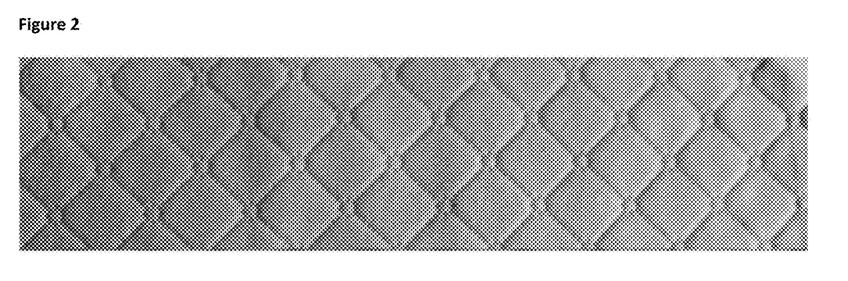
FIG. 2 is an example of a diamond pattern for applying ultrasonic energy to provide a plurality of ultrasonic energy treated portions to a dispersible non-woven article according to the present invention.
Figure 3:
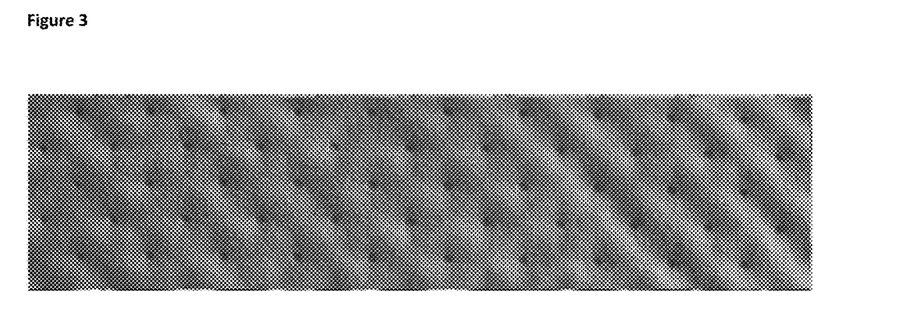
FIG. 3 is an example of a spot pattern for applying ultrasonic energy to provide a plurality of ultrasonic energy treated portions to a dispersible non-woven article according to the present invention.
Figure 4:
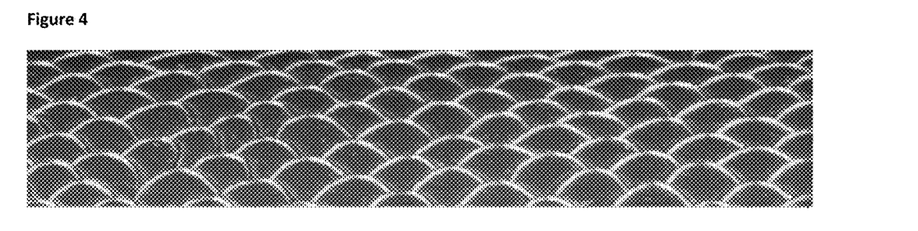
FIG. 4 is an example of a wave pattern for applying ultrasonic energy to provide a plurality of ultrasonic energy treated portions to a dispersible non-woven article according to the present invention.
Figure 5:
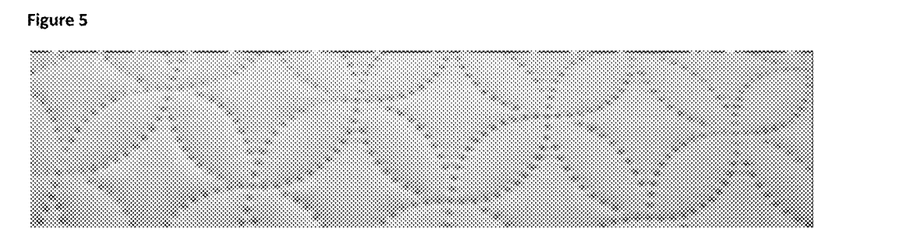
FIG. 5 is an example of a floral pattern for applying ultrasonic energy to provide a plurality of ultrasonic energy treated portions to a dispersible non-woven article according to the present invention.

Exemplary designs for the ultrasonic energy treated portions 1 include, but are not limited to, waves, chevrons, vertical lines, horizontal lines, diagonal lines, crisscross, latticework, mesh, web, net, spiral, meanders, stripes, spots, bubbles, swirls, checkers, diamond, rotated-triangle, polka dot, quatrefoil, houndstooth, gingham, argyle, fret, floral, trellis and combinations thereof. It understood that ultrasonic energy treated portions 1 may be formed in the shape of a company logo, trademark and other desirable characters.

Ultrasonic welding may include frequencies in excess of about 18,000 cps (18 kHz), as well as down to about 10,000 cps (10 kHz) or even less. Useful ranges include frequencies down to about 10,000 cps (10 kHz) or less, and up to 200,000 cps (200 kHz), or down to about 10,000 cps (10 kHz) and up to about 150,000 cps (150 kHz), or down to about 10,000 cps (10 kHz) and up to about 100,000 cps (100(kHz), or down to about 10,000 cps (10 kHz) and up to about 75,000 cps (75 kHz), or down to about 10,000 cps (10 kHz) and up to about 50,000 cps (50 kHz), or down to about 10,000 cps (10 kHz) and up to about 40,000 cps (40 kHz); or down to about 15,000 cps (15 kHz) and up to about 40,000 cps (40 kHz); or down to about 18,000 cps (18 kHz) and up to about 40,000 cps (40 kHz); or down to about 20,000 cps (20 kHz) and up to about 40,000 cps (40 kHz). Exemplary frequencies include 15 kHz, 20 kHz, 30 kHz, and 40 kHz.

The ratio of ultrasonic energy treated portions 1 to non-ultrasonic energy treated portions 2 should be sufficient to increase the ability of the wipe to be removed from the package and used while not aggravating the ability of it to be dispersible in such a way that the dispersible non-woven article should not be flushed. The ratio of ultrasonic energy treated portions 1 to non-ultrasonic energy treated portions 2 may be 1:1. The non-ultrasonic energy treated portions 2 may occupy more space than the ultrasonic energy treated portions 1, or the ultrasonic energy treated portions 1 may occupy more space than the non-ultrasonic energy treated portions 2.

For example, the non-ultrasonic energy treated portions 2 may occupy at least about 2 times as much space as the ultrasonic energy treated portions 1; or the non-ultrasonic energy treated portions 2 may occupy at least about 3 times as much space as the ultrasonic energy treated portions 1; or the non-ultrasonic energy treated portions 2 may occupy at least about 4 times as much space as the ultrasonic energy treated portions 1; or the non-ultrasonic energy treated portions 2 may occupy at least about 5 times as much space as the ultrasonic energy treated portions 1; or the non-ultrasonic energy treated portions 2 may occupy at least about 6 times as much space as the ultrasonic energy treated portions 1. The non-ultrasonic energy treated portions 2 may occupy at least about 2.5 times as much space as the ultrasonic energy treated portions 1; or the non-ultrasonic energy treated portions 2 may occupy at least about 3.5 times as much space as the ultrasonic energy treated portions 1; or the non-ultrasonic energy treated portions 2 may occupy at least about 4.5 times as much space as the ultrasonic energy treated portions 1; or the non-ultrasonic energy treated portions 2 may occupy at least about 5.5 times as much space as the ultrasonic energy treated portions 1; or the non-ultrasonic energy treated portions 2 may occupy at least about 6.5 times as much space as the ultrasonic energy treated portions 1.

For example, the ultrasonic energy treated portions 1 may occupy at least 2 times as much space as the non-ultrasonic energy treated portions 2; or the ultrasonic energy treated portions 1 may occupy at least 2.5 times as much space as the non-ultrasonic energy treated portions 2; or the ultrasonic energy treated portions 1 may occupy at least 3 times as much space as the non-ultrasonic energy treated portions 2; or the ultrasonic energy treated portions 1 may occupy at least 3.5 times as much space as the non-ultrasonic energy treated portions 2; the ultrasonic energy treated portions 1 may occupy at least 4 times as much space as the non-ultrasonic energy treated portions 2; or the ultrasonic energy treated portions 1 may occupy at least 4.5 times as much space as the non-ultrasonic energy treated portions 2; or the ultrasonic energy treated portions 1 may occupy at least 5 times as much space as the non-ultrasonic energy treated portions 2; or the ultrasonic energy treated portions 1 may occupy at least 5.5 times as much space as the non-ultrasonic energy treated portions 2; the ultrasonic energy treated portions 1 may occupy at least 6 times as much space as the non-ultrasonic energy treated portions 2; or the ultrasonic energy treated portions 1 may occupy at least about 6.5 times as much space as the non-ultrasonic energy treated portions 2.

The portion of the dispersible non-woven article that is treated with ultrasonic energy will vary depending on the application of the non-woven article.

Wet Wipes

The dispersible non-woven article of the present invention is suitable for use as a wet wipe. Water may be the main ingredient and serve as a carrier and diluent for other ingredients. The product should be capable of being stored wet without significant compromise to the wet tensile strength. Surfactants can also be added to enhance the cleansing nature of the wipe, depending on the application. Humectants such as propylene glycol and glycerine can be added to prevent premature drying of the solution and contribute to skin moisturization. In addition, some formulas incorporate oils such as mineral oil, lanolin, or silicones that help to soften skin. Thickeners, such as cellulose derivatives like hydroxymethyl cellulose, control the viscosity of the finished product and keep it the right consistency. Other ingredients include preservatives, such as methyl and propyl paraben, to ensure the solution does not support microbial growth. Fragrance can be added to increase consumer appeal and to help over-come body odors, but fragrance-free products can also be offered. Featured ingredients may also be added to increase consumer appeal. These include natural ingredients that are known to be kind to the skin such as aloe vera or oatmeal extract.

Other Additives

The binder composition may include other additives. Non limiting examples include lubricants, surfactants, oils, perfumes, anti-bacterial agents, anti-microbial agents, colorants, vitamins including Vitamin E, Vitamin C, Vitamin A and any of the Vitamin B complexes, anti-irritant agents including alpha-bisabolo, lotions, petroleum-based agents, non-ionic surfactants, anti-acne agents, anticaking agent, antioxidants, biological additives, cosmetic agents, degreasers, emulsifiers, external analgesics, preservatives, reducing agents, skin bleaching agents, skin protectants, sunscreen agents, ultraviolet light absorbers, abrasives, corrosion inhibitors, sequestering agents, and combinations thereof.

Preferred surfactants include, but are not limited to, polyethylene glycol dioleate, such as polyethylene glycol 400 dioleate, and polyethylene glycol monooleate, such as polyethylene glycol 400 monooleate. Examples of lubricating oil include vegetable oil, mineral oil, natural wax and synthetic oil. In preferred embodiments, the lubricant may be mineral oil. An example of a commercially available lubricant is the SUNPAR® series (Holly Refining & Marketing—Tulsa LLC, Tulsa, Okla.). Other suitable additives include trihydroxymethypropyl trioleate, carnauba wax, the Hyprene series (Ergon Refining Inc., Jackson, Miss.), the SPECTRASYN™ series of polyalphaolefins (ExxonMobil Chemical Company, Beaumont, Tex.), and the like.

Flushability

In preferred embodiments, dispersible non-woven articles described herein are flushable. Flushability of a dispersible non-woven article may be determined by tests known to those of skill in the art. Preferably, flushability of an dispersible non-woven article may be determined by a series of tests, such as those set forth in the Association of the Nonwoven Fabrics Industry (INDA) and European Disposables and Nonwovens Association (EDANA) Guidance Document for Assessing the Flushability of Nonwoven Consumer Products, Second Edition, 2009 (INDA Guidance 2009), which is incorporated herein in its entirety by reference, wherein the ability for an dispersible non-woven article to be disposed via modern plumbing and sewage systems is evaluated.

In some embodiments, flushable indicates capable of passing the INDA Slush box test. The Slush box test consists of an oscillating box containing 2.0 liters of tap water or wastewater (optional), in which a single dispersible non-woven article (e.g., individual non-woven article) is incubated for 3 hours. Subsequently, the contents of the box are transferred to and then rinsed through a 12.5 mm perforated plate sieve. The materials retained on the sieve are recovered and analyzed gravimetrically. The percent of the dispersible non-woven article's initial dry mass passing through the sieve is calculated based on difference."

In some embodiments, the dispersible non-woven article may have a pass through percentage value of at least about 20%, at least about 30%, at least about 40%, at least about 50%, at least about 60%, at least about 70%, at least about 75%, at least about 80%, at least about 85%, at least about 90%, at least about 95%, or at least about 99% through a 12.5 mm sieve as measured by the INDA FG 522.2 Slosh Box Test as recited in INDA Guidance 2009. In some embodiments, the dispersible non-woven article has a pass through percentage value of at least about 20%, at least about 30%, at least about 40%, at least about 50%, at least about 60%, at least about 70%, at least about 75%, at least about 80%, at least about 85%, at least about 90%, or at least about 95% through a 1.5 mm sieve as measured by the INDA FG 522.2 Slosh Box Test as recited in INDA Guidance 2009.

In some embodiments, flushable indicates passing any one flushability test. For example, 1) the dispersible non-woven article clearing a toilet bowl and trap on at least 90% of flushes and the dispersible non-woven article traveling greater than 10 m in a drainline over two flushes or traveling sufficient distance such that a distance traveled by a center of mass of the dispersible non-woven article does not show a downward trend over five flushes as measured by the INDA FG 510.1 Toilet Bowl and Drainline Clearance Test as recited in INDA Guidance 2009; 2) the dispersible non-woven article settles all of the way to the bottom of a 115 cm column of water in less than 24 hours as measured by the INDA FG 512.1 Column Settling Test as recited in INDA Guidance 2009; 3) more than 95% of the dispersible non-woven article passes through a 12 mm sieve after 3 hours of agitation in water as measured by the INDA FG 511.1 Dispersability Shake Flask Test as recited in INDA Guidance 2009 or after 240 cycles of rotating a cylinder containing water and the dispersible non-woven article as measured by the INDA FG 511.2 Dispersability Tipping Tube Test as recited in INDA Guidance 2009; 4) more than 95% of the dispersible non-woven article passes through a 1 mm sieve after 28 days of exposure to an activated sludge as measured by the INDA FG 513.1 or 513.2 Aerobic Biodegradation Test as recited in INDA Guidance 2009 or more than 60% of the dispersible non-woven article is converted to carbon dioxide after 28 days of exposure to an activated sludge as measured by INDA FG 513.2 Aerobic Biodegradation Test as recited in INDA Guidance 2009; and 5) more than 95% of the dispersible non-woven article passes through a 1 mm sieve after 28 days of exposure to an anaerobic digester sludge as measured by the INDA FG 514.1 Anaerobic Biodegradation Test as recited in INDA Guidance 2009 or more than 70% of carbon contained within the dispersible non-woven article is converted to gas or greater than 95% of the dispersible non-woven article passes through a 1 mm sieve after 56 days of exposure to an anaerobic digester sludge as measured by the INDA FG 514.2 Anaerobic Biodegradation Test as recited in INDA Guidance 2009.

Methods of Making an Article

A method of making a dispersible non-woven article according to the present invention may include: forming a web of fibers; contacting the web of fibers with a binder composition; and drying the binder composition to form a dried binder in contact with the fibers. One of skill in the art will appreciate that other techniques are suitable for the methods described herein.

In a nonwoven article, the assembly of textile fibers may be held together 1) by mechanical interlocking in a random web or mat; 2) by fusing of the fibers, as in the case of thermoplastic fibers; or 3) by bonding with a cementing medium such as starch, casein, rubber latex, a cellulose derivative or synthetic resin. Initially, the fibers may be oriented in one direction or may be deposited in a random manner. This web or sheet is then bonded together by one of the methods described above. Fiber lengths may range from 0.25 inch to 6 inches for crimped fibers up to continuous filament in spunbonded fabrics.

U.S. Pat. No. 3,879,257, which is incorporated herein in its entirety by reference, discloses a method of forming a web of fibers that is suitable for use with the methods described herein. Other suitable means of forming the web of fibers include, but are not limited to, wet forming, such as incline wire forming, Fourdrinier forming and cylinder forming; air forming, such as short fiber air forming and synthetic and/or wood pulp air forming; and dry forming, such as carding and bonding.

U.S. Patent Application Pub. No. 2007/0044891 and U.S. Pat. No. 8,282,777, each of which is incorporated herein in its entirety by reference, discloses methods of single recreping and double recreping that are suitable for use with the present invention.

The binder composition and dried binder of this invention do not require a curing step, but one can be used if so desired. Other suitable means of contacting the web of fibers with a binder composition and drying the binder composition to form a dried binder in contact with the fibers include, but are not limited to, printing and drying, spraying and drying, foam coating and drying, size press addition and drying, blade coating and drying.

Dispersible non-woven articles described herein have a tensile strength that is sufficient for the article to be used as a wipe for some period of time after contacting a liquid. Strength of an article may be determined by tests known to those of skill in the art. Preferably, strength of an dispersible non-woven article may be determined by a test, such as the INDA WSP 110.4.R4 Strip Tensile Test, 2012 revision, which is incorporated herein in its entirety by reference.

EXAMPLES

The following are prophetic examples illustrating the preparation of dispersible non-woven articles according to non-limiting embodiments of the present invention.

Example 1

Manufacturing a Dispersible Non-Woven Article

A softwood web of fibers for use in the present invention having a basis weight of 50 gsm can be formed by Example III of U.S. Pat. No. 3,879,257. The resulting web can be processed by double-sided printing a binder composition in an amount of approximately 5% by weight of the total article per side, or 10% by weight of the total article overall. The binder composition may comprise VINNAPAS™ 400 ("V-400") a polyvinyl alcohol stabilized vinyl acetate-ethylene copolymer dispersion; VINNOL™ CEN 2752 a surfactant stabilized vinyl chloride-ethylene copolymer dispersion; VINNAPAS™ 426 ("V-426") a polyvinyl alcohol stabilized vinyl acetate-ethylene-acrylic acid terpolymer dispersion; or VINNAPAS™ 465 a polyvinyl alcohol stabilized vinyl acetate-ethylene copolymer dispersion. The article can then be cured for around 15 minutes in a 150° C. oven. The pH of the composition can be adjusted to around 7 is required. Ultrasonic energy at a frequency of about 10,000 cps (20 kHz) and up to about 40,000 cps (40 kHz), can then be applied in a pattern corresponding to any one of FIGS. 2 to 3. The product would be allowed to age for 7 days prior to the Slosh Box testing.

The resulting dispersible non-woven article is expected to have sufficient webstengh so that the article would not fall apart upon touch, but would come apart in a turbulent aqueous environment, such as the waste treatment environment.

Cross direction wet tensile strength may be determined in accordance with the Association of the Nonwoven Fabrics Industry (INDA) WSP 110.4.R4 Strip Tensile Test, 2012 revision.

Example 2

Manufacturing a Wet Wipe

The dispersible non-woven article of Example 1 can be fed onto coating machinery, where an aqueous solution, for instance a cleansing solution can be applied to prepare the wet wipe. Several methods can be employed in this process. The cleansing solution can be added by running the fabric through a trough of the solution, or sheets of fabric may be sprayed with the formula from a series of nozzles. Alternatively, individual towelettes may be packaged in sealed foil pouches. In this process, sheets of laminated foil can be fed into automated equipment which would fold them into a small pouch and heat seals three sides to form an open envelope. Simultaneously, another conveyor line feeds the non-woven article into the pouch. A liquid feed mechanism, including conduits extending through the stuffing bars, injects moisturizing liquid into the towelette packet simultaneously with the stuffing of the towelette material. Immediately following this operation, another heat sealer closes the pouch tightly. The product would be allowed to age for 7 days prior to the Slosh Box testing.

The resulting wet-wipe is expected to have sufficient webstengh so that the wet-wipe would not fall apart upon touch, but would come apart in a turbulent aqueous environment, such as the waste treatment environment.

The invention claimed is:

1. A method of making a dispersible non-woven article, the method comprising:
    forming a web of fibers;
    contacting the web of fibers with a binder composition, wherein the binder composition comprises an aqueous polymer dispersion; and
    drying the binder composition to form a dried binder in contact with the web of fibers, and
    subjecting the dried binder in contact with the web of fibers to ultrasonic energy forming a plurality of ultrasonic energy treated portions and a plurality of non-ultrasonic energy treated portions;
    wherein the article has a wet tensile strength, and wherein the article is flushable and dispersible.

2. The method of claim 1, wherein the aqueous polymer dispersion comprises a polymer comprising at least one polymeric segment selected from the group consisting of, vinyl chloride, vinyl acetate, ethylene, vinyl alcohol, styrene, butadiene, methyl methacrylate, methyl acrylate, ethyl methacrylate, ethyl acrylate, butyl methacrylate, butyl acrylate, isobutyl methacrylate, isobutyl acrylate, 2-ethylhexyl acrylate, lauryl methacrylate, lauryl acrylate, acrylic acid and its salts, methacrylic acid and its salts, itaconic acid and its salts, acrylamide, hydroxyethyl methacrylate, hydroxyethyl acrylate, partially and fully hydrolyzed polyvinyl alcohol, and polysaccharides.

3. The method of claim 1, wherein the polymer has a glass transition temperature of less than about 60° C.

4. The method of claim 1, wherein forming a web of fibers comprises wet forming, air laying, dry forming or a combination thereof.

5. The method of claim 1, wherein the fibers used to make the article have a pass through percentage value of at least about 25% through a 12.5 mm sieve after 2 hours in a slosh box.

6. The method of claim 1, wherein the web of fibers has a basis weight of from about 10 gsm to about 150 gsm.

7. The method of claim 1, wherein the ultrasonic energy treated portions are formed in a wave shape, chevron shape, vertical line shape, horizontal line shape, diagonal line shape, crisscross shape, latticework shape, mesh shape, web shape, net shape, spiral shape, meander shape, stripe shape, spot shape, bubble shape, swirl shape, checkers shape, diamond shape, rotated-triangle shape, polka dot shape, quatrefoil shape, houndstooth shape, gingham shape, argyle shape, fret shape, floral shape, trellis shape or a combinations thereof.

8. The method of claim 1, wherein the ratio of ultrasonic energy treated portions to non-ultrasonic energy treated portions is 1:1.

9. The method of claim 1, wherein the non-ultrasonic energy treated portions occupy more space than the ultrasonic energy treated portions.

10. The method of claim 1, wherein the ultrasonic energy treated portions occupy more space than the non-ultrasonic energy treated portions.

\* \* \* \* \*